(12) United States Patent
Kataoka

(10) Patent No.: US 12,126,296 B2
(45) Date of Patent: Oct. 22, 2024

(54) MOTOR CONTROL APPARATUS

(71) Applicant: SANYO DENKI CO., LTD., Tokyo (JP)

(72) Inventor: Takashi Kataoka, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 136 days.

(21) Appl. No.: 17/958,773

(22) Filed: Oct. 3, 2022

(65) Prior Publication Data
US 2023/0131949 A1    Apr. 27, 2023

(30) Foreign Application Priority Data

Oct. 22, 2021 (JP) .................................. 2021-173064

(51) Int. Cl.
*H02P 3/22*        (2006.01)
*G08B 21/18*       (2006.01)

(52) U.S. Cl.
CPC .............. *H02P 3/22* (2013.01); *G08B 21/185* (2013.01)

(58) Field of Classification Search
CPC ................................. H02P 3/22; G08B 21/185
USPC ........................................................ 318/375
See application file for complete search history.

(56) References Cited

U.S. PATENT DOCUMENTS

| | | | |
|---|---|---|---|
| 2015/0239474 A1* | 8/2015 | Nakamura | B60L 3/0061 180/170 |
| 2016/0226407 A1 | 8/2016 | Saitou et al. | |
| 2017/0250645 A1* | 8/2017 | Tateda | H02P 6/24 |
| 2019/0113576 A1* | 4/2019 | Saito | G01R 31/42 |

FOREIGN PATENT DOCUMENTS

| | | |
|---|---|---|
| JP | 2011-217474 A | 10/2011 |
| JP | 2016-144232 A | 8/2016 |

* cited by examiner

*Primary Examiner* — Kawing Chan
(74) *Attorney, Agent, or Firm* — RANKIN, HILL & CLARK LLP

(57) ABSTRACT

A motor control apparatus includes: a motor; an inverter circuit configured to drive the motor; a first wiring connecting the motor and the inverter circuit; a second wiring connecting the motor and the inverter circuit; a first sensor configured to detect a first current flowing through the first wiring; a second sensor configured to detect a second current flowing through the second wiring; and a dynamic braking circuit, and the dynamic braking circuit is connected between the first sensor and the motor and between the second sensor and the inverter circuit.

5 Claims, 5 Drawing Sheets

MOTOR CONTROL APPARATUS

CROSS-REFERENCE TO RELATED APPLICATION

This application is based on Japanese Patent Application No. 2021-173064 filed with the Japan Patent Office on Oct. 22, 2021, the entire content of which is hereby incorporated by reference.

BACKGROUND

1. Technical Field

One embodiment of the present disclosure relates to a motor control apparatus.

2. Related Art

A dynamic braking circuit is known. When power fails or when an amplifier fails, the dynamic braking circuit in a motor control apparatus consumes rotational energy as heat by shorting the terminals of a motor through a resistor, thus bringing the motor to a quick stop. Furthermore, a failure detection apparatus is known which detects a failure in the dynamic braking circuit due to, for example, relay welding.

For example, a motor control apparatus having a failure detection function, which is disclosed in JP-A-2016-144232, applies a predetermined direct current voltage to a dynamic braking circuit, compares the value of a current flowing in the dynamic braking circuit with a threshold, and accordingly determines the presence or absence of a failure in the dynamic braking circuit. Moreover, a motor control apparatus and a failure detection method for the same, which are disclosed in JP-A-2011-217474, are also known.

SUMMARY

A motor control apparatus includes: a motor; an inverter circuit configured to drive the motor; a first wiring connecting the motor and the inverter circuit; a second wiring connecting the motor and the inverter circuit; a first sensor configured to detect a first current flowing through the first wiring; a second sensor configured to detect a second current flowing through the second wiring; and a dynamic braking circuit. The dynamic braking circuit is connected between the first sensor and the motor and between the second sensor and the inverter circuit.

BRIEF DESCRIPTION OF DRAWINGS

FIG. 5 is a flowchart of monitoring the number of times a dynamic braking relay is turned ON.

DETAILED DESCRIPTION

Figure 1:
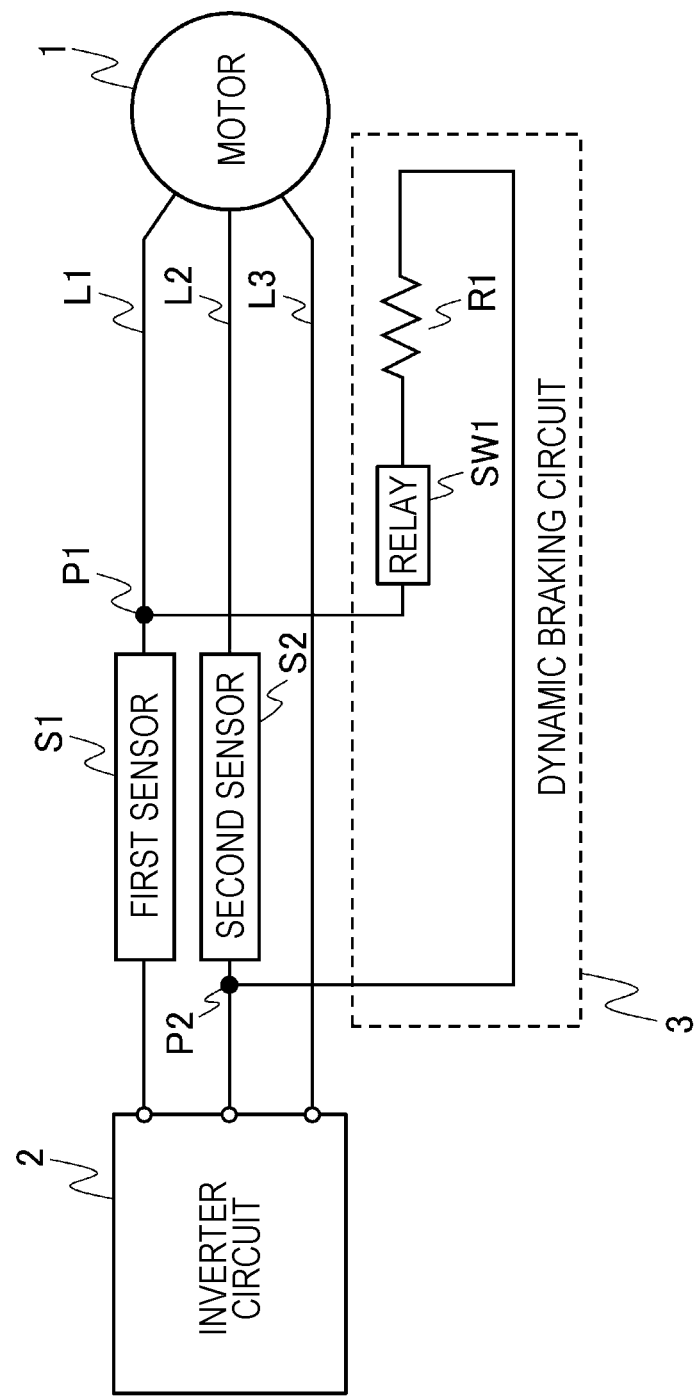
FIG. 1 is a schematic diagram of a motor control apparatus according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The above-mentioned dynamic braking circuit is wired closer to the motor than to a current detection circuit including a current detecting resistor and a current sensor. Hence, it is difficult to measure the current value of a dynamic braking current flowing through the dynamic braking circuit, the dynamic braking current resulting from an induced voltage in the motor. Therefore, it is difficult to detect a failure due to a short circuit of the resistor in the dynamic braking circuit and to monitor (do monitoring of) the state of the dynamic braking circuit.

One object of the present disclosure is to provide a motor control apparatus having the function of detecting a failure in a dynamic braking circuit and the function of monitoring the dynamic braking circuit.

A motor control apparatus according to one aspect of the present disclosure includes: a motor; an inverter circuit configured to drive the motor; a first wiring connecting the motor and the inverter circuit; a second wiring connecting the motor and the inverter circuit; a first sensor configured to detect a first current flowing through the first wiring; a second sensor configured to detect a second current flowing through the second wiring; and a dynamic braking circuit. The dynamic braking circuit is connected between the first sensor and the motor and between the second sensor and the inverter circuit.

According to one aspect of the present disclosure, it is possible to provide a motor control apparatus having the function of detecting a failure in a dynamic braking circuit and the function of monitoring the dynamic braking circuit.

An embodiment of the present disclosure is described hereinafter with reference to the drawings. Descriptions of members having the same reference numerals as members already described in the detailed description are omitted for the convenience of description. Moreover, the dimensions of each member illustrated in the drawings may be different from actual dimensions thereof for the convenience of description.

(Configuration of Motor Control Apparatus)

FIG. 1 is a schematic diagram of a motor control apparatus according to the embodiment of the present disclosure. As illustrated in FIG. 1, the motor control apparatus includes a motor 1, an inverter circuit 2, a first wiring L1, a second wiring L2, and a third wiring L3 that connect the motor 1 and the inverter circuit, a first sensor S1, a second sensor S2, and a dynamic braking circuit 3.

The inverter circuit 2 drives the motor 1. The inverter circuit 2 outputs three-phase alternating current (U, V, and W phases). The inverter circuit 2 generates three-phase alternating current from commercial power. For example, the inverter circuit 2 outputs the U-phase current to the first wiring L1, outputs the V-phase current to the second wiring L2, and outputs the W-phase current to the third wiring L3.

The three-phase alternating current outputted from the inverter circuit 2 flows through the first wiring L1, the second wiring L2, and the third wiring L3.

The current flowing through the first wiring L1 is called a first current. The current flowing through the second wiring L2 is called a second current. The first wiring L1 is provided with the first sensor S1 that detects the first current. The second wiring L2 is provided with the second sensor S2 that detects the second current. For example, a sensor of a resistance detection type, such as a current detecting resistor, or a sensor of a magnetic field detection type, such as a Hall-effect device, can be adopted as the first sensor S1 and the second sensor S2.

In a normal state where the dynamic braking circuit 3 does not work, the three-phase alternating current is supplied from the inverter circuit 2 to the motor 1 through the first wiring L1, the second wiring L2, and the third wiring L3. At this point in time, the first current flowing through the first wiring L1 can be measured by the first sensor S1. Moreover, the second current flowing through the second wiring L2 can be measured by the second sensor S2.

The dynamic braking circuit 3 includes a dynamic braking resistor R1 and a dynamic braking relay SW1 that are connected to each other in series. When the dynamic braking relay SW1 has been turned ON, the terminals of the motor 1 are shorted through the dynamic braking resistor R1. In other words, a dynamic braking current flows from the motor 1 to a circuit including the first wiring L1, the dynamic braking circuit 3, and the second wiring L2. Consequently, the induced current generated by the rotation of the motor 1 is converted to thermal energy in the dynamic braking resistor R1, and the dynamic braking circuit 3 functions as a dynamic brake.

The dynamic braking circuit 3 of the embodiment is connected to a first contact P1 between the first sensor S1 and the motor 1, and a second contact P2 between the second sensor S2 and the inverter circuit 2. In other words, the dynamic braking circuit 3 is connected between the first contact P1 and the second contact P2. Hence, when the dynamic braking relay SW1 has been turned ON, the dynamic braking current flows from the motor 1 along a path including the first wiring L1, the first contact P1, the dynamic braking relay SW1, the dynamic braking resistor R1, the second contact P2, the second sensor S2, and the second wiring L2. In other words, the dynamic braking current flows through the second sensor S2. Hence, the dynamic braking current that flows through the dynamic braking circuit 3 when the dynamic braking relay SW1 is ON can be measured by the second sensor S2.

Moreover, if the inverter circuit is accidentally operated while the dynamic braking relay SW1 is ON, an inverter circuit current flows through the dynamic braking circuit 3. Furthermore, for example, also if there is a failure due to, for example, welding of a contact of the dynamic braking relay SW1, the dynamic braking relay SW1 is closed (turned ON), and the inverter circuit current flows through the dynamic braking circuit 3. The first sensor S1 can measure the inverter circuit current that flows through the dynamic braking circuit 3 at such times when the dynamic braking circuit 3 fails.

Figure 2:
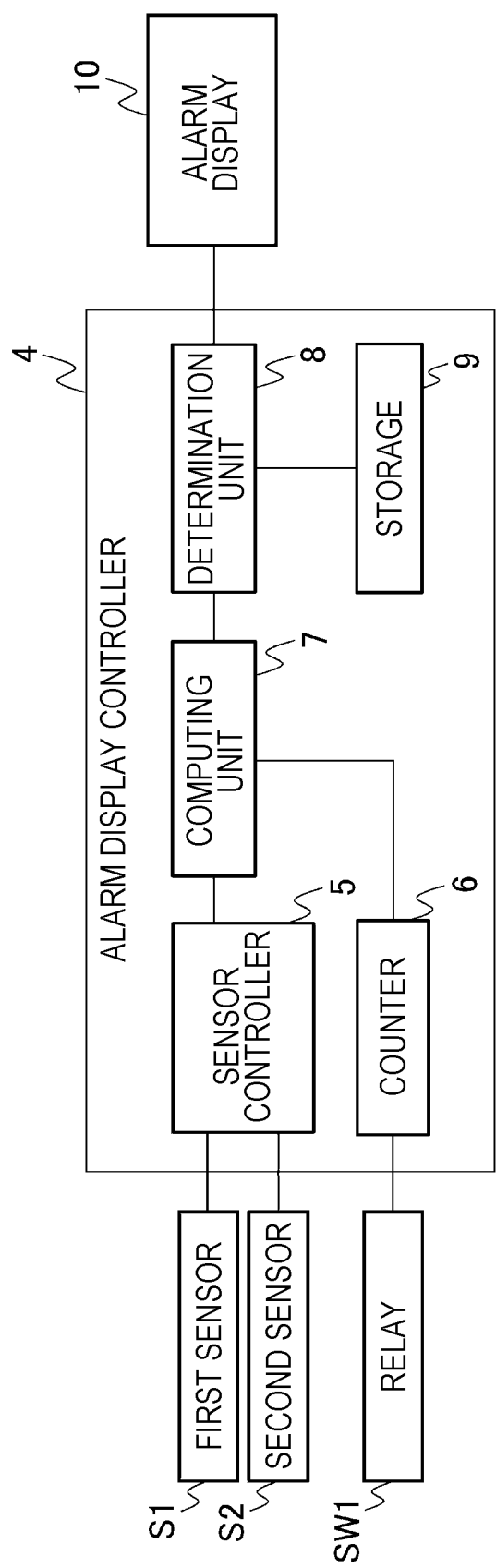
FIG. 2 is a block diagram of an alarm control apparatus according to the embodiment of the present disclosure.

FIG. 2 is a block diagram of an alarm control apparatus according to the embodiment of the present disclosure. As illustrated in FIG. 2, the alarm control apparatus includes an alarm display controller 4 and an alarm display 10.

The alarm control apparatus has two types of functions: a failure detection mode to detect a failure in the dynamic braking circuit 3; and a monitoring mode for the dynamic braking circuit 3. In the failure detection mode, the alarm display controller 4 detects abnormalities such as overcurrent due to welding of the contact of the dynamic braking relay SW1, and overcurrent due to a resistor short circuit of the dynamic braking resistor R1. In the monitoring mode, the alarm display controller 4 monitors the amount of heat generated in the dynamic braking resistor R1, and/or the number of times the dynamic braking relay SW1 is turned ON, and detects an abnormality. If having detected an abnormality, the alarm display controller 4 notifies a predetermined alarm to the alarm display 10, and causes the alarm display 10 to display the predetermined alarm for a user.

A sensor controller 5 acquires the current value of the first current detected by the first sensor S1, and the current value of the second current detected by the second sensor S2, and transmits, to a computing unit 7, the current values of the second and first currents. A counter 6 counts the number of times the dynamic braking relay SW1 has been turned ON, and transmits the number of times of turning ON to the computing unit 7. The computing unit 7 computes the amount of heat generated in the dynamic braking resistor R1 on the basis of the current value of the second current received from the sensor controller 5, and the number of times of turning ON received from the counter 6, and transmits, to a determination unit 8, the current value of the first current, the current value of the second current, the amount of heat that has been computed, and the number of times of turning ON. The determination unit 8 receives, from the computing unit 7, the current value of the first current, the current value of the second current, the amount of heat that has been computed, and the number of times of turning ON. Furthermore, the determination unit 8 reads preset thresholds from a storage 9. The determination unit 8 compares the values that have been received with the thresholds that have been read, and determines whether or not there is overcurrent, whether or not an abnormal amount of heat has been generated, and/or whether or not the number of times of turning ON is abnormal. If having determined that there is any of the above abnormalities, the determination unit 8 notifies a predetermined alarm to the alarm display 10, and causes the alarm display 10 to display the predetermined alarm.

(Failure Detection Mode)

Figure 3:
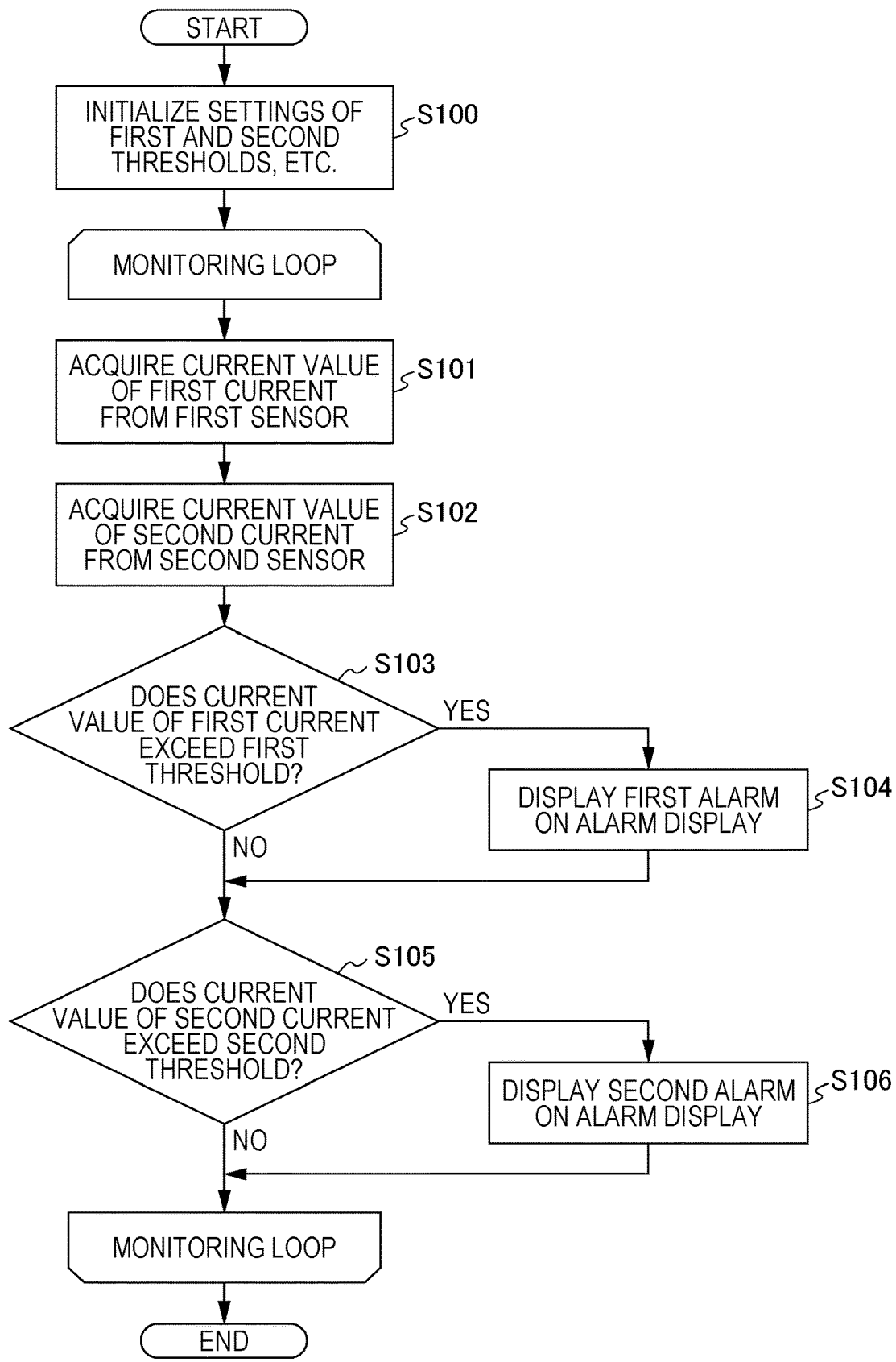
FIG. 3 is a flowchart of detecting a failure in a dynamic braking circuit.

FIG. 3 is a flowchart of detecting a failure in the dynamic braking circuit 3. The flow of processes in failure detection mode is described with reference to FIG. 3, and the internal block of the alarm display controller 4 illustrated in FIG. 2.

After the failure detection mode starts, the alarm display controller 4, for example, loads a first and a second threshold prespecified by the user into the storage 9 including volatile memory, to initialize, for example, the settings of the first and second thresholds (S100). The first and second thresholds are prerecorded by the user in, for example, non-volatile memory. Next, the sensor controller 5 acquires the current value of the first current from the first sensor S1, and acquires the current value of the second current from the second sensor S2 (S101 and S102). The current values of the first and second currents that have been acquired are transmitted from the sensor controller 5 to the determination unit 8 via the computing unit 7. The determination unit 8 determines whether or not the current value of the first current exceeds the first threshold that has been read from the storage 9 (S103) and, if the current value of the first current exceeds the first threshold, notifies a first alarm to the alarm display 10 to cause the alarm display 10 to display the first alarm (S104). The first alarm indicates, for example, an abnormality in the current through the inverter circuit 2 due to a failure in the dynamic braking circuit 3. Next, the determination unit 8 determines whether or not the current value of the second current exceeds the second threshold that has been read from the storage 9 (S105) and, if the current value of the second current exceeds the second threshold, notifies a second alarm to the alarm display 10 to cause the alarm display 10 to display the second alarm (S106). The second alarm indicates, for example, an abnormality in the current through the dynamic braking circuit 3 due to a short circuit of the dynamic braking resistor R1. The alarm display controller 4 periodically repeats the steps of S101 to S106, thus monitoring the current values of the first and second currents, and detecting overcurrent due to welding of the contact of the dynamic braking relay SW1, and overcurrent due to a resistor short circuit of the dynamic braking resistor R1.

When a short circuit of the inverter circuit current due to the contact welding of the dynamic braking relay SW1, and a short circuit of the dynamic braking resistor R1 during operation of the dynamic braking circuit 3 occur, the above process flow enables detecting the occurrence of such short circuits, and notifying the user of the occurrence with an alarm.

(Monitoring Mode)

Figure 4:
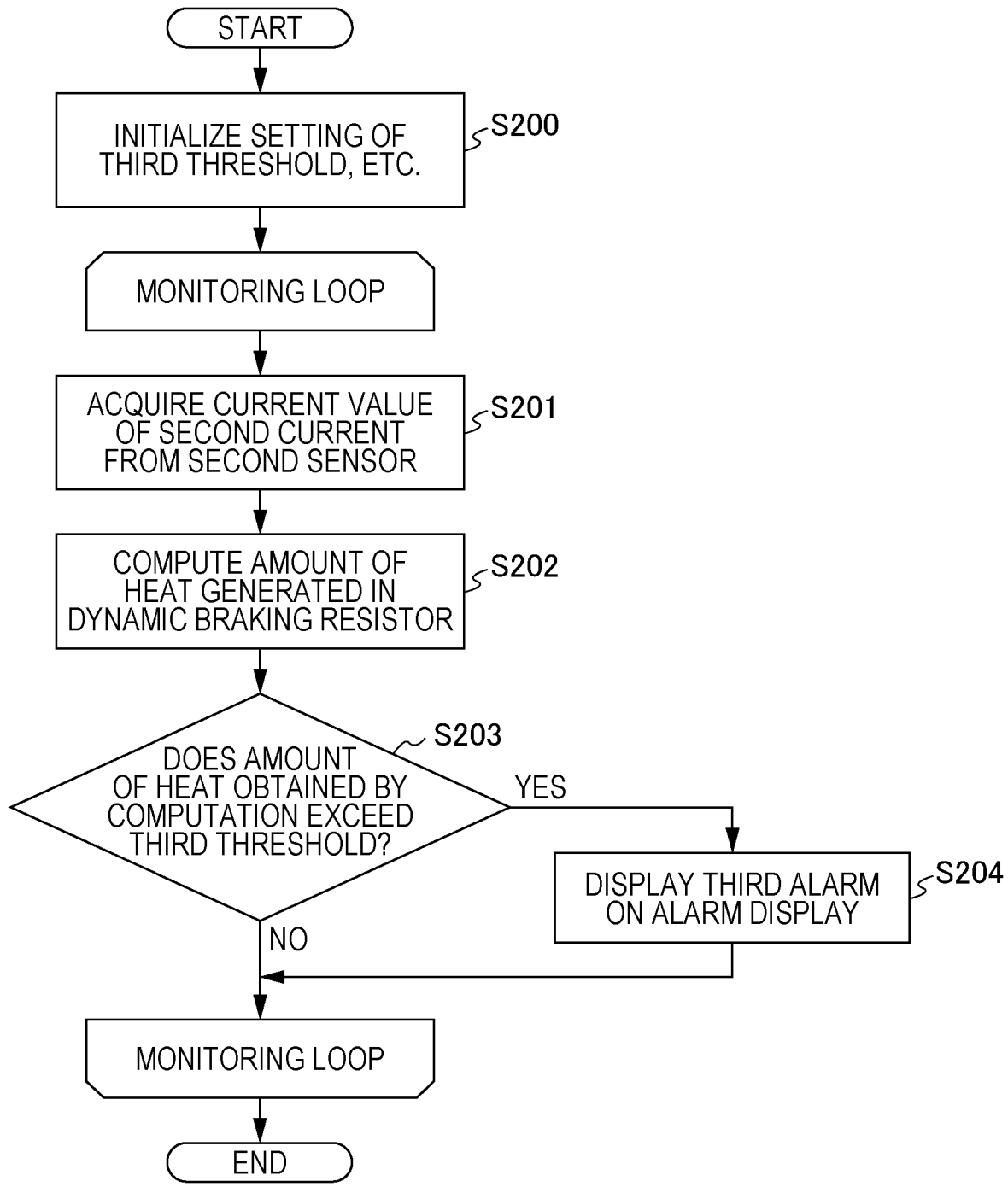
FIG. 4 is a flowchart of monitoring the amount of heat generated in a dynamic braking resistor.

FIG. 4 is a flowchart of monitoring the amount of heat generated in the dynamic braking resistor R1. The flow of processes in the monitoring mode is described with reference to FIG. 4 and the internal block of the alarm display controller 4 illustrated in FIG. 2.

After the monitoring mode starts, the alarm display controller 4, for example, loads a third threshold prespecified by the user into the storage 9, to initialize, for example, the setting of the third threshold (S200). The third threshold is prerecorded by the user in, for example, non-volatile memory. Next, the sensor controller 5 acquires the current value of the second current from the second sensor S2 (S201). The current value of the second current that has been acquired is transmitted from the sensor controller 5 to the computing unit 7. The computing unit 7 computes the amount of heat generated in the dynamic braking resistor R1, from the current value of the second current (S202). The "amount of heat" may be the amount of heat generated per unit time, or may be the total amount of heat that has been generated. The computing unit 7 transmits the above amount of heat that has been computed to the determination unit 8. Next, the determination unit 8 determines whether or not the amount of heat that has been transmitted exceeds the third threshold that has been read from the storage 9 (S203) and, if the amount of heat exceeds the third threshold, notifies a third alarm to the alarm display 10 to cause the alarm display 10 to display the third alarm (S204). The alarm display controller 4 periodically repeats the steps of S201 to S204, thus monitoring the amount of heat generated in the dynamic braking resistor R1, and detecting an abnormality in the circuit.

Figure 5:
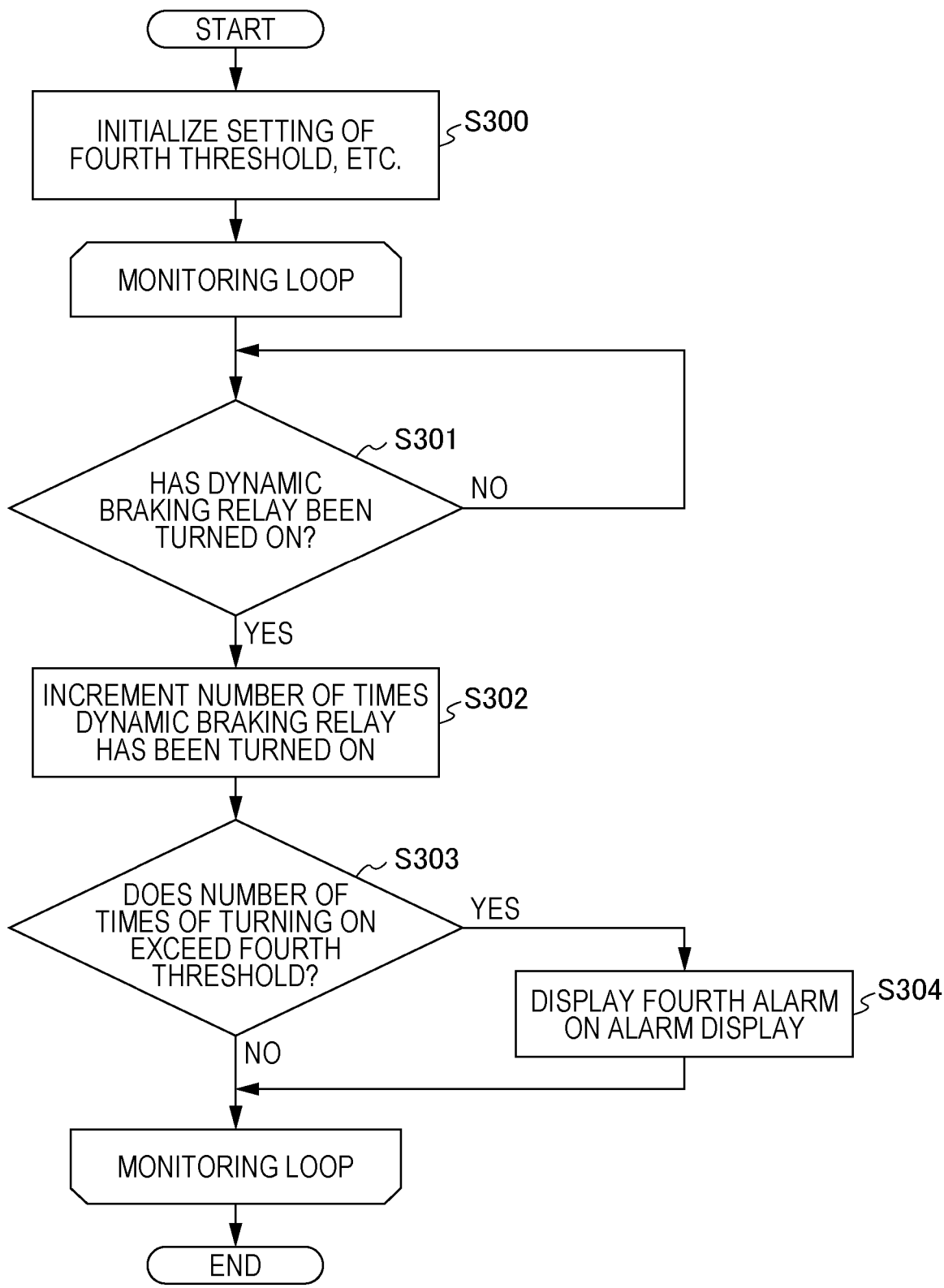

FIG. 5 is a flowchart of monitoring the number of times the dynamic braking relay SW1 is turned ON. The flow of processes in the monitoring mode is described with reference to FIG. 5 and the internal block of the alarm display controller 4 illustrated in FIG. 2.

After the monitoring mode starts, the alarm display controller 4, for example, loads a fourth threshold prespecified by the user into the storage 9, to initialize, for example, the setting of the fourth threshold (S300). The fourth threshold is prerecorded by the user in, for example, non-volatile memory. Next, the counter 6 monitors whether or not the dynamic braking relay SW1 is turned ON (S301) and, if the dynamic braking relay SW1 has been turned ON, increments the number of times of turning ON of the counter (S302). The number of times of turning ON that has been incremented is transmitted from the counter 6 to the determination unit 8 via the computing unit 7. Next, the determination unit 8 determines whether or not the number of times of turning ON that has been transmitted exceeds the fourth threshold that has been read from the storage 9 (S303) and, if the number of times of turning ON exceeds the fourth threshold, notifies a fourth alarm to the alarm display 10 to cause the alarm display 10 to display the fourth alarm (S304). The alarm display controller 4 periodically repeats the steps of S301 to S304, thus monitoring the number of times the dynamic braking relay SW1 is turned ON, and detecting an abnormality in the frequency of operation of the dynamic brake.

The process flow illustrated in FIG. 4 enables detecting an abnormality in the dynamic braking circuit 3 on the basis of the amount of heat generated in the dynamic braking resistor R1 and notifying the user of the abnormality with the alarm before the dynamic braking resistor R1 fails. Moreover, the process flow illustrated in FIG. 5 enables detecting an abnormality in the frequency of operation of the dynamic brake on the basis of the number of times the dynamic braking relay SW1 has been turned ON, and notifying the user of the abnormality with the alarm before the dynamic braking relay SW1 fails.

Up to this point the embodiment of the present disclosure has been described. In terms of this, it is needless to say that the technical scope of the present disclosure should not be construed in a limited manner by the detailed description. The embodiment is a mere example. Those skilled in the art understand that the embodiment can be modified in various manners within the technical scope of the present disclosure described in the claims. The technical scope of the present disclosure should be determined on the basis of the scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor control apparatus comprising:
   a motor;
   an inverter circuit configured to drive the motor;
   a first wiring connecting the motor and the inverter circuit;
   a second wiring connecting the motor and the inverter circuit;
   a first sensor configured to detect a first current flowing through the first wiring;
   a second sensor configured to detect a second current flowing through the second wiring; and
   a dynamic braking circuit,
   wherein the dynamic braking circuit is connected between the first sensor and the motor and between the second sensor and the inverter circuit, thereby the first sensor detects a failure of the dynamic braking circuit when the dynamic braking circuit is not operated and the second sensor detects a failure of the dynamic braking circuit and an amount of heat generated in the dynamic braking circuit when the dynamic braking circuit is operated.

2. The motor control apparatus according to claim 1, further comprising:
   an alarm display; and
   an alarm display controller,
   wherein the dynamic braking circuit includes a dynamic braking resistor, upon having determined that a current value of the first current detected by the first sensor has exceeded a predetermined first threshold, the alarm display controller displays, on the alarm display, a first alarm indicating an abnormality in the current through the inverter circuit due to a failure in the dynamic braking circuit, and upon having determined that a current value of the second current detected by the second sensor has exceeded a predetermined second threshold, the alarm display controller displays, on the alarm display, a second alarm indicating an abnormality in the current through the dynamic braking circuit due to a short circuit of the dynamic braking resistor.

3. The motor control apparatus according to claim 2, wherein the alarm display controller computes the amount of heat generated in the dynamic braking resistor from the current value of the second current and, upon having determined that the amount of heat has exceeded a predetermined third threshold, displays a third alarm on the alarm display.

4. A motor control apparatus comprising:
a motor;
an inverter circuit configured to drive the motor;
a first wiring connecting the motor and the inverter circuit;
a second wiring connecting the motor and the inverter circuit;
a first sensor configured to detect a first current flowing through the first wiring;
a second sensor configured to detect a second current flowing through the second wiring;
a dynamic braking circuit;
an alarm display; and
an alarm display controller, wherein
the dynamic braking circuit is connected between the first sensor and the motor and between the second sensor and the inverter circuit,
the dynamic braking circuit includes a dynamic braking resistor,
upon having determined that a current value of the first current detected by the first sensor has exceeded a predetermined first threshold, the alarm display controller displays, on the alarm display, a first alarm indicating an abnormality in the current through the inverter circuit due to a failure in the dynamic braking circuit,
upon having determined that a current value of the second current detected by the second sensor has exceeded a predetermined second threshold, the alarm display controller displays, on the alarm display, a second alarm indicating an abnormality in the current through the dynamic braking circuit due to a short circuit of the dynamic braking resistor,
the dynamic braking circuit includes a dynamic braking relay, and
the alarm display controller counts the number of times the dynamic braking relay has been turned ON and, upon having determined that the number of times of turning ON has exceeded a predetermined fourth threshold, displays a fourth alarm on the alarm display.

5. A motor control apparatus comprising:
a motor;
an inverter circuit configured to drive the motor;
a first wiring connecting the motor and the inverter circuit;
a second wiring connecting the motor and the inverter circuit;
a first sensor configured to detect a first current flowing through the first wiring;
a second sensor configured to detect a second current flowing through the second wiring;
a dynamic braking circuit;
an alarm display; and
an alarm display controller, wherein
the dynamic braking circuit is connected between the first sensor and the motor and between the second sensor and the inverter circuit,
the dynamic braking circuit includes a dynamic braking resistor,
upon having determined that a current value of the first current detected by the first sensor has exceeded a predetermined first threshold, the alarm display controller displays, on the alarm display, a first alarm indicating an abnormality in the current through the inverter circuit due to a failure in the dynamic braking circuit,
upon having determined that a current value of the second current detected by the second sensor has exceeded a predetermined second threshold, the alarm display controller displays, on the alarm display, a second alarm indicating an abnormality in the current through the dynamic braking circuit due to a short circuit of the dynamic braking resistor,
the alarm display controller computes the amount of heat generated in the dynamic braking resistor from the current value of the second current and, upon having determined that the amount of heat has exceeded a predetermined third threshold, displays a third alarm on the alarm display,
the dynamic braking circuit includes a dynamic braking relay, and
the alarm display controller counts the number of times the dynamic braking relay has been turned ON and, upon having determined that the number of times of turning ON has exceeded a predetermined fourth threshold, displays a fourth alarm on the alarm display.

* * * * *